US011365635B2

United States Patent
Read et al.

(10) Patent No.: US 11,365,635 B2
(45) Date of Patent: Jun. 21, 2022

(54) CMC COMPONENT WITH INTEGRAL COOLING CHANNELS AND METHOD OF MANUFACTURE

(71) Applicant: United Technologies Corporation, Farmington, CT (US)

(72) Inventors: Kathryn S. Read, Marlborough, CT (US); Andrew J. Lazur, Laguna Beac, CA (US); Thomas E. Clark, Sanford, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 3 days.

(21) Appl. No.: 16/785,173

(22) Filed: Feb. 7, 2020

(65) Prior Publication Data

US 2021/0199013 A1    Jul. 1, 2021

Related U.S. Application Data

(60) Provisional application No. 62/849,474, filed on May 17, 2019.

(51) Int. Cl.
*F01D 5/18* (2006.01)
*F01D 5/14* (2006.01)
(Continued)

(52) U.S. Cl.
CPC .............. *F01D 5/147* (2013.01); *B29C 70/30* (2013.01); *F01D 5/18* (2013.01); *F01D 9/02* (2013.01);
(Continued)

(58) Field of Classification Search
CPC ... F01D 5/147; F01D 5/18; F01D 9/02; F01D 11/08; B29C 70/30; B29L 2031/08;
(Continued)

(56) References Cited

U.S. PATENT DOCUMENTS 3,095,180 A * 6/1963 Clarke ...................... F01D 5/18
416/233
3,246,469 A * 4/1966 Moore ..................... F02K 1/822
60/265

(Continued)

FOREIGN PATENT DOCUMENTS

EP    1801390 A2    6/2007
EP    1930548 A2    6/2008
(Continued)

OTHER PUBLICATIONS

Extended European Search Report for EP Application No. 20174792.0, dated Sep. 10, 2020, 10 pages.
(Continued)

*Primary Examiner* — J. Todd Newton
*Assistant Examiner* — Theodore C Ribadeneyra
(74) *Attorney, Agent, or Firm* — Kinney & Lange, P.A.

(57) ABSTRACT

A fiber-reinforced component for use in a gas turbine engine includes a fiber sleeve forming a cooling channel and a plurality of fiber plies enclosing the fiber sleeve, with the plurality of fiber plies forming first and second walls separated by the fiber sleeve. The fiber-reinforced component further includes a matrix material between fibers of the fiber sleeve and the plurality of fiber plies.

19 Claims, 8 Drawing Sheets

(51) Int. Cl.
*B29C 70/30* (2006.01)
*F01D 9/02* (2006.01)
*F01D 11/08* (2006.01)
*B29L 31/08* (2006.01)

(52) U.S. Cl.
CPC ........... *F01D 11/08* (2013.01); *B29L 2031/08* (2013.01); *F05D 2220/32* (2013.01); *F05D 2230/20* (2013.01); *F05D 2240/12* (2013.01); *F05D 2240/30* (2013.01); *F05D 2240/55* (2013.01)

(58) Field of Classification Search
CPC ............ F05D 2220/32; F05D 2230/20; F05D 2240/12; F05D 2240/30; F05D 2240/55
See application file for complete search history.

(56) References Cited

U.S. PATENT DOCUMENTS

| | | | | |
|---|---|---|---|---|
| 3,709,632 | A * | 1/1973 | Emmerson | F01D 5/184 416/97 R |
| 4,312,624 | A * | 1/1982 | Steinbauer, Jr | F01D 5/189 415/115 |
| 5,640,767 | A * | 6/1997 | Jackson | C23C 14/5873 29/889.721 |
| 5,916,510 | A | 6/1999 | Jessen | |
| 6,497,776 | B1 * | 12/2002 | Butler | C04B 35/18 156/89.11 |
| 6,514,046 | B1 * | 2/2003 | Morrison | F01D 9/02 416/229 A |
| 6,627,019 | B2 | 9/2003 | Jarmon et al. | |
| 6,746,755 | B2 | 6/2004 | Morrison et al. | |
| 6,764,754 | B1 * | 7/2004 | Hunter | B32B 3/12 428/301.4 |
| 7,481,621 | B2 * | 1/2009 | Campbell | F01D 5/08 415/115 |
| 7,600,979 | B2 | 10/2009 | Steibel et al. | |
| 8,202,588 | B2 | 6/2012 | Keller et al. | |
| 8,257,809 | B2 | 9/2012 | Morrison et al. | |
| 8,696,319 | B2 * | 4/2014 | Naik | B29B 11/16 416/230 |
| 10,011,043 | B2 | 7/2018 | Gray et al. | |
| 10,012,093 | B2 * | 7/2018 | Mugglestone | F01D 5/189 |
| 10,017,425 | B2 | 7/2018 | Tuertscher et al. | |
| 10,995,622 | B2 * | 5/2021 | Mugglestone | F01D 5/188 |
| 11,085,317 | B2 * | 8/2021 | Johnson | F01D 11/08 |
| 2003/0068222 | A1 * | 4/2003 | Cunha | F01D 5/189 415/115 |
| 2005/0077341 | A1 | 4/2005 | Larrieu et al. | |
| 2009/0003993 | A1 * | 1/2009 | Prill | F01D 5/284 415/134 |
| 2010/0150703 | A1 * | 6/2010 | Gonzalez | F01D 9/04 415/173.1 |
| 2011/0070095 | A1 * | 3/2011 | Harron | F01D 5/18 416/96 R |
| 2011/0123351 | A1 * | 5/2011 | Hada | F01D 5/189 416/97 R |
| 2012/0125585 | A1 * | 5/2012 | Morrison | F28F 7/02 165/172 |
| 2012/0219402 | A1 * | 8/2012 | Harding | F01D 5/189 415/115 |
| 2013/0142660 | A1 * | 6/2013 | McCaffrey | F01D 5/18 416/241 B |
| 2013/0315725 | A1 * | 11/2013 | Uechi | F01D 5/18 415/208.1 |
| 2014/0161626 | A1 * | 6/2014 | Podgorski | F01D 5/282 416/96 R |
| 2014/0219788 | A1 * | 8/2014 | Nilsson | B23P 11/02 415/175 |
| 2014/0271153 | A1 * | 9/2014 | Uskert | F01D 9/065 415/177 |
| 2014/0311163 | A1 * | 10/2014 | Uskert | F01D 5/18 60/806 |
| 2016/0040553 | A1 * | 2/2016 | Headland | F01D 25/14 415/126 |
| 2016/0101561 | A1 * | 4/2016 | Walston | B23K 1/0018 428/34.6 |
| 2016/0177743 | A1 * | 6/2016 | Thomas | F01D 5/18 416/230 |
| 2016/0215634 | A1 * | 7/2016 | Walston | F01D 9/041 |
| 2016/0258320 | A1 * | 9/2016 | Thomas | F01D 5/189 |
| 2017/0101873 | A1 | 4/2017 | Morgan et al. | |
| 2018/0065337 | A1 * | 3/2018 | Grasso | B32B 15/04 |
| 2018/0119549 | A1 * | 5/2018 | Vetters | F01D 5/147 |
| 2018/0135417 | A1 * | 5/2018 | Surace | F01D 5/18 |
| 2018/0135452 | A1 * | 5/2018 | Propheter-Hinckley | F01D 5/147 |
| 2018/0223681 | A1 | 8/2018 | Gallier et al. | |
| 2018/0328189 | A1 | 11/2018 | Frey et al. | |
| 2018/0370158 | A1 * | 12/2018 | Gallier | B29D 99/0028 |

FOREIGN PATENT DOCUMENTS

| | | |
|---|---|---|
| EP | 2134542 A2 | 12/2009 |
| EP | 2998510 A2 | 3/2016 |
| EP | 3048254 A1 | 7/2016 |
| EP | 3241993 A1 | 11/2017 |
| EP | 3650653 A1 | 5/2020 |
| EP | 3693549 A1 | 8/2020 |

OTHER PUBLICATIONS

Extended European Search Report for EP Application No. 21207520.4, dated Feb. 23, 2022, 8 pages.

* cited by examiner

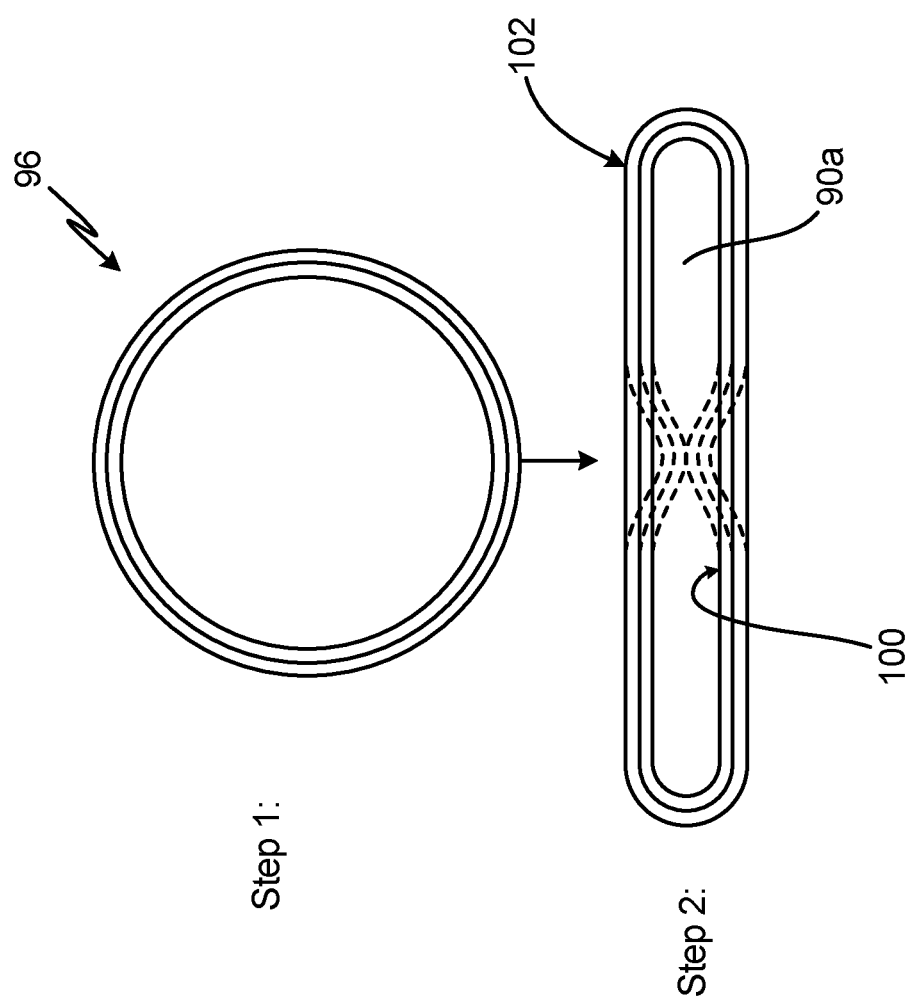

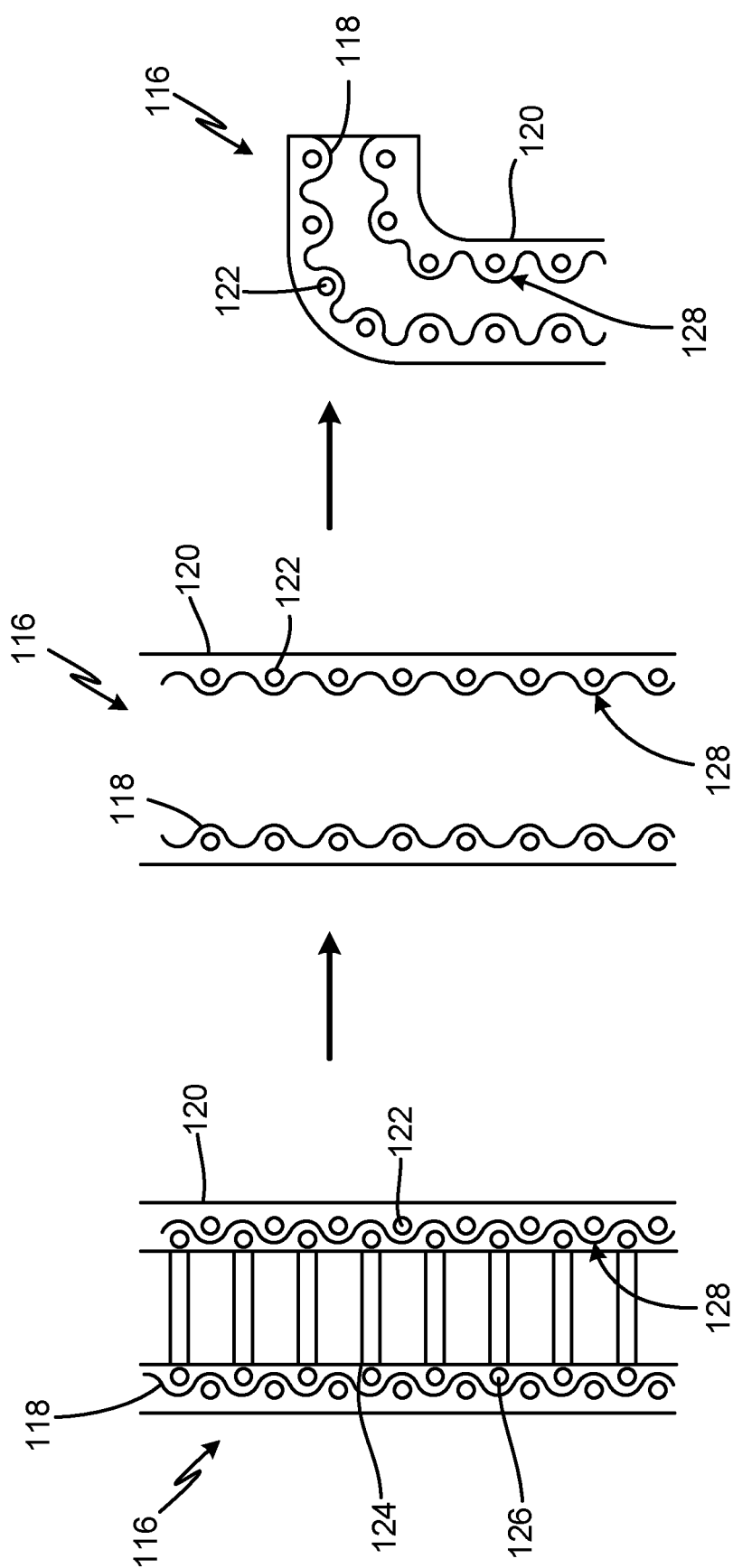

CMC COMPONENT WITH INTEGRAL COOLING CHANNELS AND METHOD OF MANUFACTURE

CROSS-REFERENCE TO RELATED APPLICATION(S)

This application claims the benefit of U.S. Provisional Application No. 62/849,474, filed May 17, 2019, for "CMC COMPONENT WITH INTEGRAL COOLING CHANNELS AND METHOD OF MANUFACTURE" by K. Read, A. Lazur, and T. Clark.

BACKGROUND

The present disclosure relates generally to the manufacture of components for a gas turbine engine and more particularly to the manufacture of ceramic matrix composites (CMC) with integral cooling channels.

Lightweight CMC is a highly desirable material for gas turbine engine applications. CMCs exhibit excellent physical, chemical, and mechanical properties at high temperatures, making CMCs particularly desirable for producing hot section components of a gas turbine engine, including blade outer air seals (BOAS), vanes, blades, combustors, and exhaust structures. Designing a CMC component capable of meeting a sufficient balance of strength and thermal gradient targets has been challenging in regions where both the maximum CMC interface temperature and bulk proportional stress targets are violated.

A need exists to produce CMC components with a relatively low through-wall thermal gradient while providing large cross-sectional moments of inertia to react to high pressure loads.

SUMMARY

In one aspect, a fiber-reinforced component for use in a gas turbine engine includes a fiber sleeve forming a cooling channel and a plurality of fiber plies enclosing the fiber sleeve, with the plurality of fiber plies forming first and second walls separated by the fiber sleeve. The fiber-reinforced component further includes a matrix material between fibers of the fiber sleeve and the plurality of fiber plies.

In another aspect, a method for manufacturing a fiber-reinforced component with integral fiber-formed cooling channels for use in a gas turbine engine includes forming a fiber sleeve, enclosing the fiber sleeve with a plurality of fiber plies to form a fiber preform of a component with internal cooling provided by the cooling channel, and densifying the fiber preform.

The present summary is provided only by way of example, and not limitation. Other aspects of the present disclosure will be appreciated in view of the entirety of the present disclosure, including the entire text, claims and accompanying figures.

BRIEF DESCRIPTION OF THE DRAWINGS

FIG. 5 is a schematicized sectional view of a cooling channel of FIGS. 1 and 2 in different stages of a manufacturing process.

FIG. 6 is a schematicized sectional view of an alternative embodiment of a cooling channel at different stages of a manufacturing process.

Figure 1:
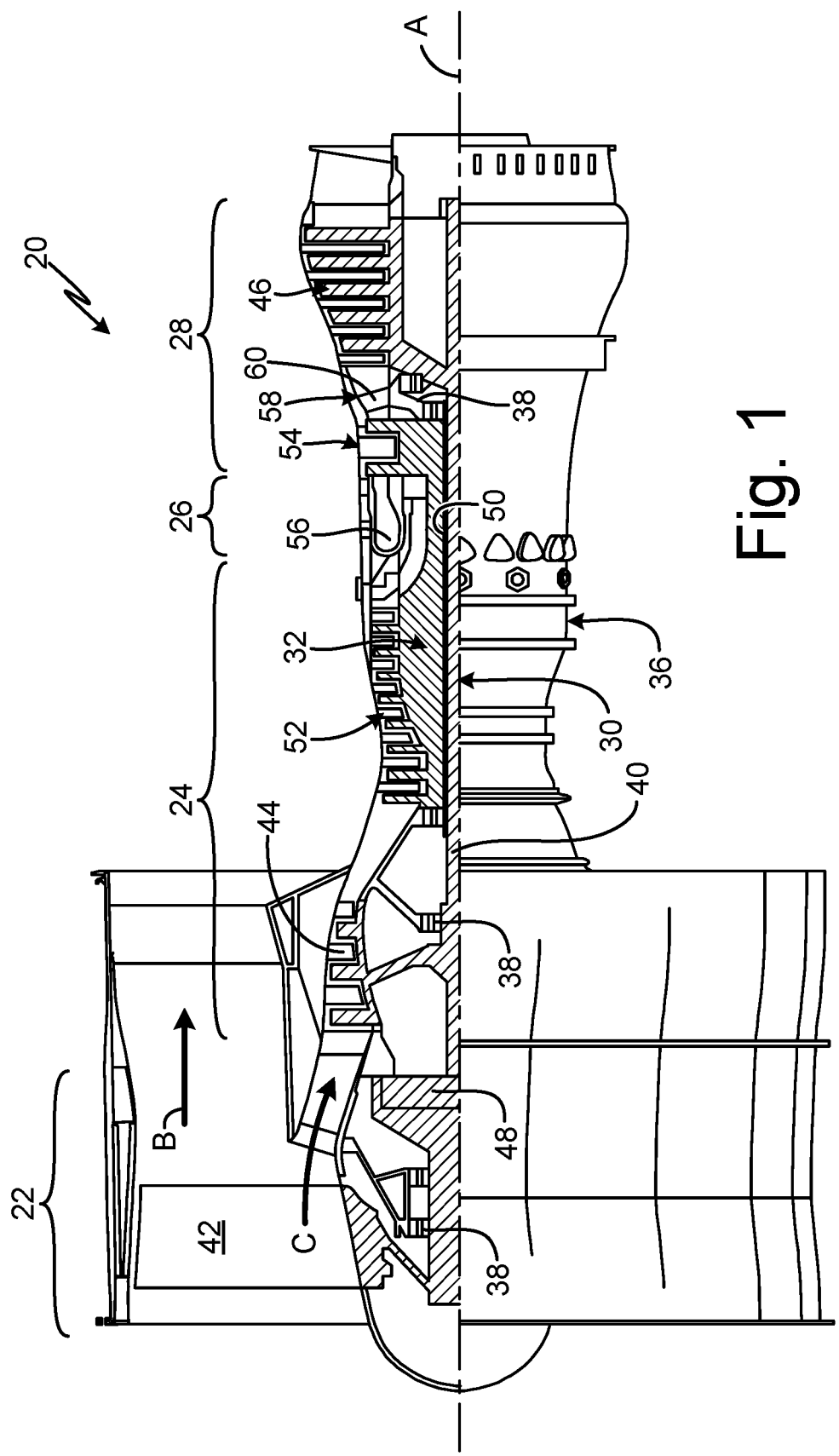
FIG. 1 is a quarter-sectional view of a gas turbine engine.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure provides a method of manufacturing a CMC component with integral cooling channels constructed of CMC braided fiber sleeves. The channels can enable large film cooling access across a gas path face of the component and reduce through-wall thermal gradients along the component inner wall. The use of CMC braided sleeves provides for seamless channel construction and can increase the specific stiffness of the component, provide an efficient distribution of load, and provide resistance to crack propagation. Additionally, braided fiber sleeves can be used to form cooling channels having a variety of geometries, including geometries that change along a cooling flow path or branch into multiple channels, and internal structures can be formed in the braiding process to increase surface area and optimize fluid flow.

Although the present disclosure is generally directed to cooling channels formed from braided fiber sleeves, woven, knit, or other seamless fiber sleeves are also contemplated and it will be understood by one of ordinary skill in the art that other types of seamless fiber sleeves can replace any of the braided fiber sleeves in the disclosed embodiments. The disclosed method can be used to form any of a variety of components for use in a gas turbine engine, including but not limited to blades, vanes, platforms, combustors, exhaust nozzles or mixers, and inlet structures. The disclosed method is also applicable to the manufacture of CMC components used in other technical fields.

FIG. 1 is a quarter-sectional view of a gas turbine engine 20 that includes fan section 22, compressor section 24, combustor section 26 and turbine section 28. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes airfoils/vanes 60, which are in the core airflow path and function as an inlet guide vane for low pressure turbine 46. Utilizing vanes 60 of mid-turbine frame 58 as inlet guide vanes for low pressure turbine 46 decreases the length of low pressure turbine 46 without increasing the axial length of mid-turbine frame 58. Reducing or eliminating the number of vane stages in low pressure turbine 46 shortens the axial length of turbine section 28. Thus, the compactness of gas turbine engine 20 is increased and a higher power density may be achieved.

Each of the compressor section 24 and the turbine section 28 can include alternating rows of rotor assemblies and vane assemblies (shown schematically) that carry airfoils that extend into the core flow path C. To improve efficiency, static outer shroud seals (not shown), such as a BOAS, can be located radially outward from rotor airfoils to reduce tip clearance and losses due to tip leakage.

Figure 2:
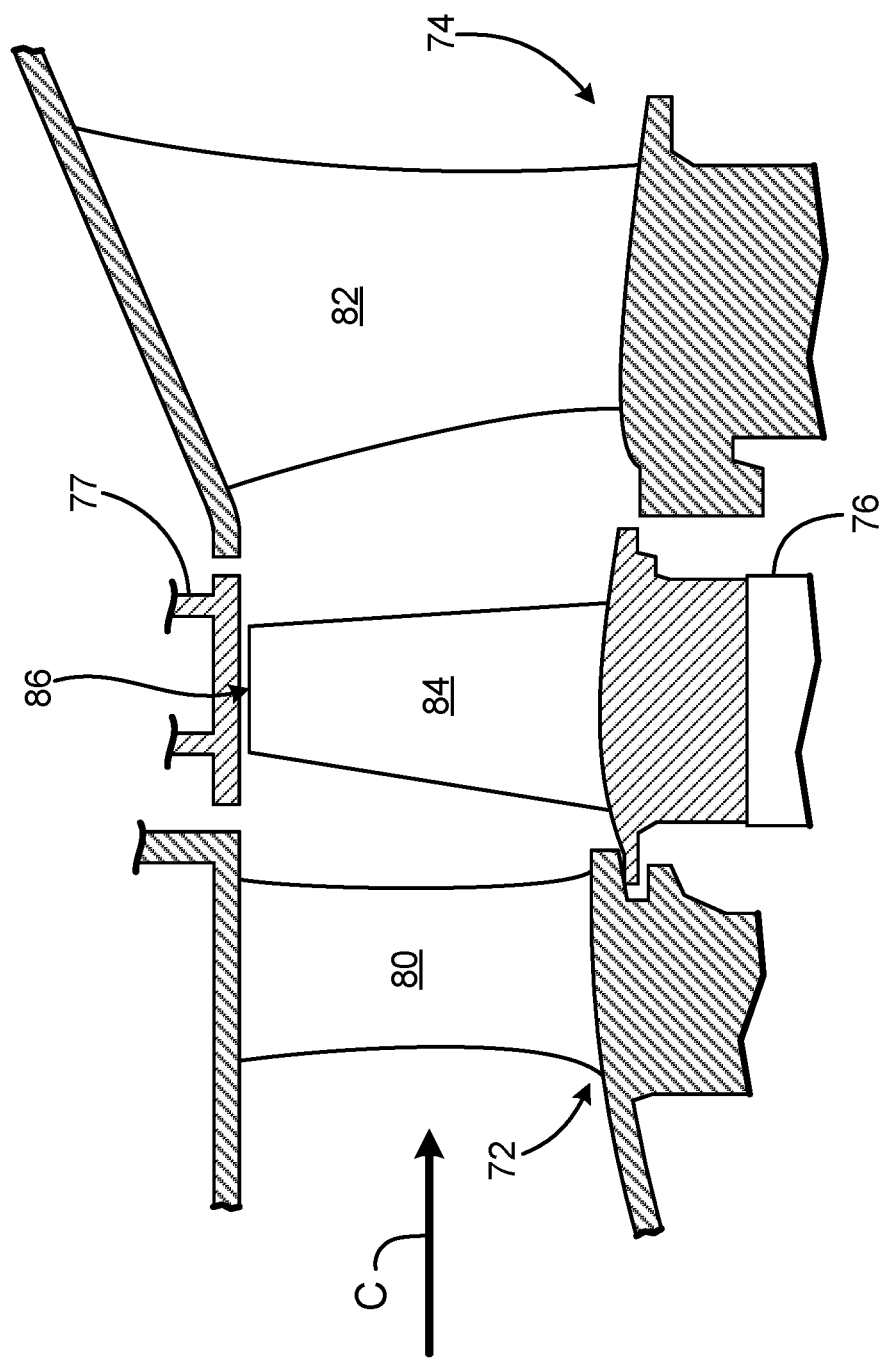
FIG. 2 is a schematic view of a portion of the gas turbine engine with a blade and blade outer air seal (BOAS).

FIG. 2 illustrates a portion of a gas turbine engine, such as, but not limited to, gas turbine engine 20 of FIG. 1. The portion of the gas turbine engine illustrated in FIG. 2 is intended to be non-limiting. The portion of the gas turbine engine illustrated in FIG. 2 has stator assemblies 72 and 74, and rotor 76. Stator assemblies 72 and 74 can each have a plurality of airfoils 80 and 82, respectively, to direct core airflow C. Rotor 76 can have a plurality of airfoils 84 to create or extract energy from core airflow. BOAS 77 can be configured to reduce core airflow leakage across rotor tip 86. BOAS 77 can be located radially inward of an annular case (not shown) and radially outward of rotor tip 86. Conventionally, a plurality of segmented BOAS 77 can be used, collectively forming a ring around rotor 76 to seal multiple airfoils 84. BOAS 77 can be mounted to an annular ring or segmented seal carrier (not shown) or directly to the case as known in the art. Airfoils 80, 82, 84 and BOAS 77 are non-limiting examples of components that can require cooling during operation and can be formed using method disclosed herein. For the purposes of illustration, the manufacture of BOAS 77 is described in further detail herein. It will be understood by one of ordinary skill in the art that the methods disclosed for the manufacture of BOAS 77 can be applied to the manufacture of other components with cooling channels and is not limited to the particular structures disclosed.

Figure 3:
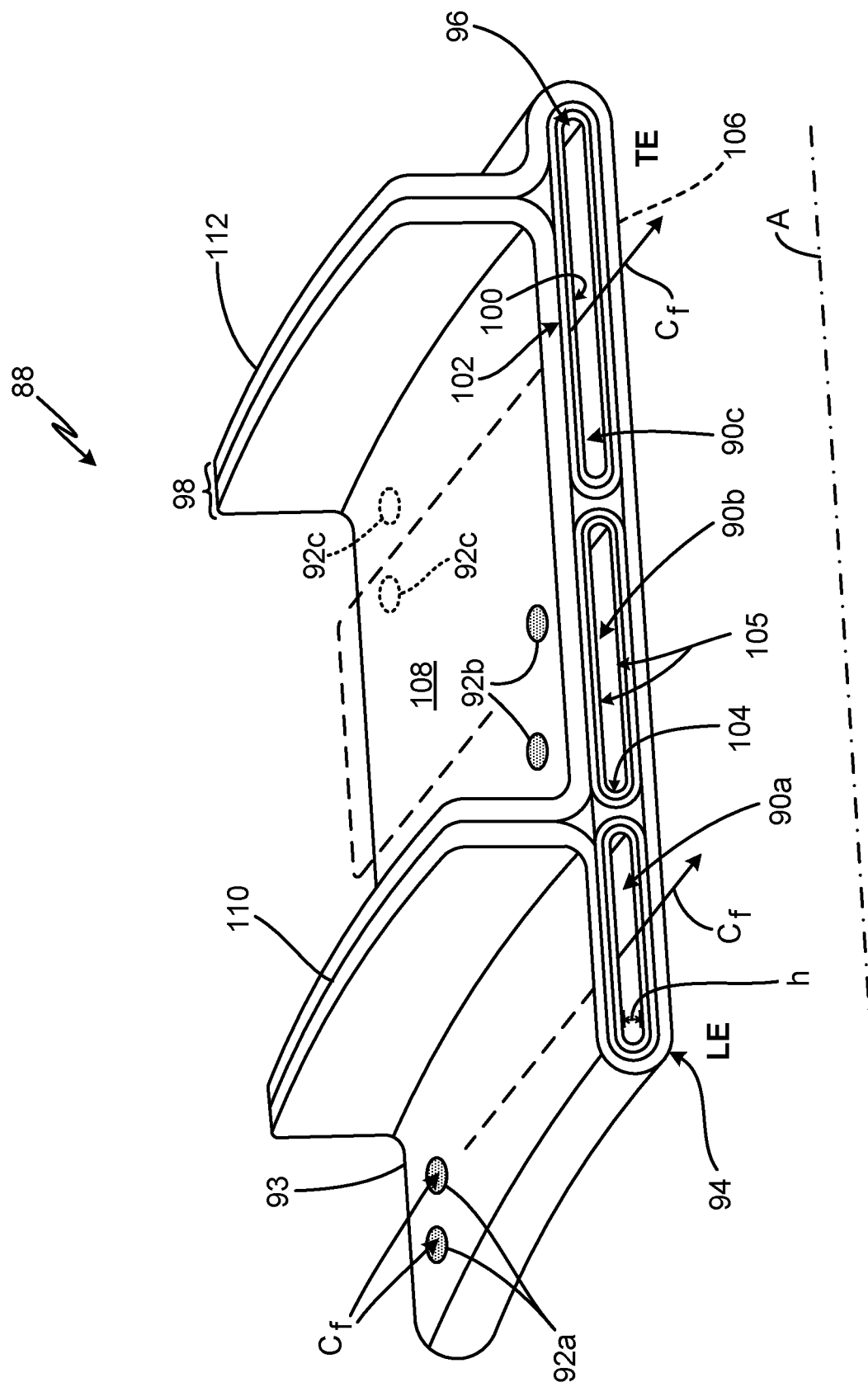
FIG. 3 is a schematicized sectional view of a BOAS fiber preform with cooling channels.
Figure 4:
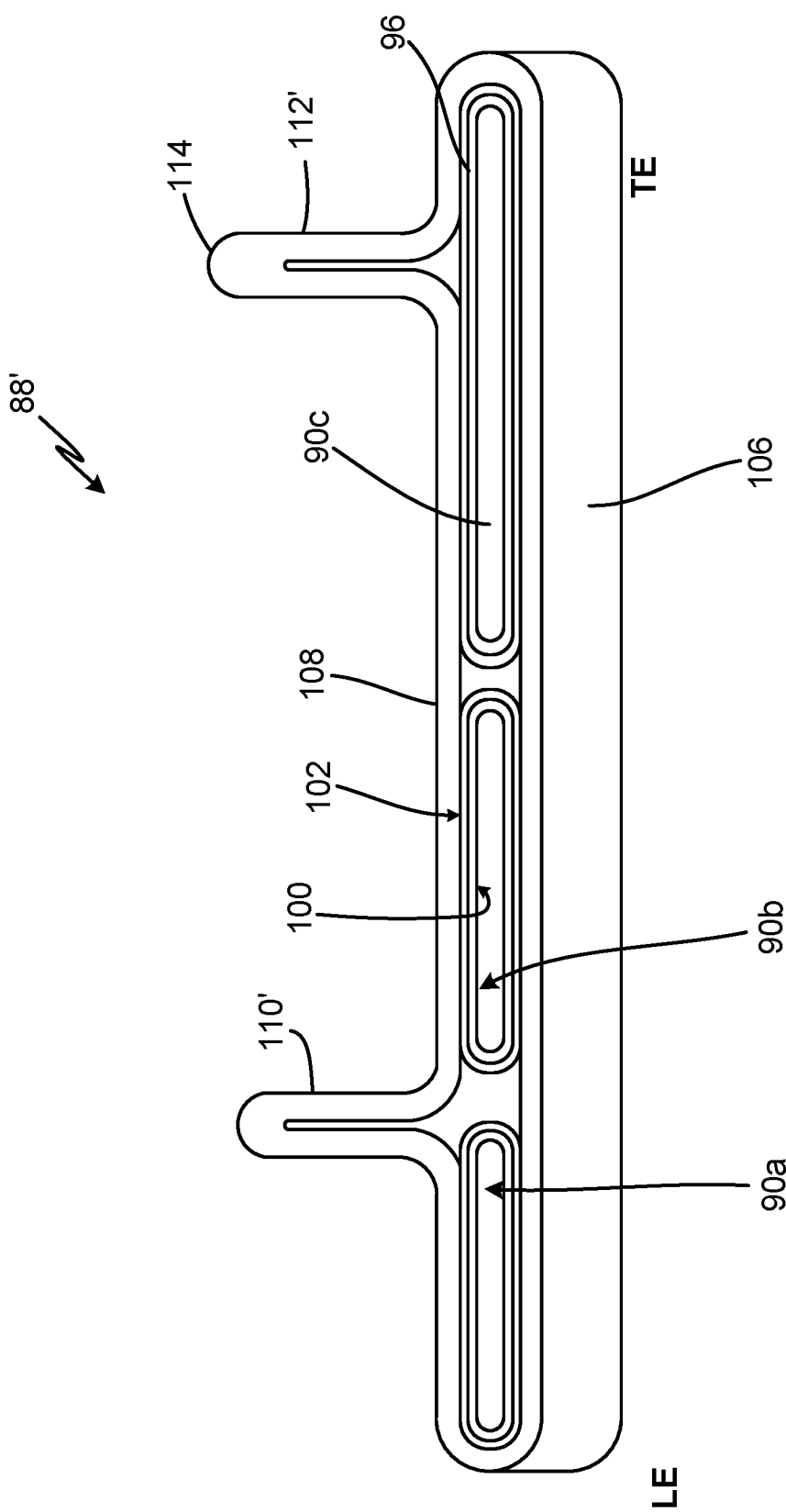
FIG. 4 is a schematicized sectional view of an alternative BOAS fiber preform with cooling channels.

FIGS. 3 and 4 provide schematicized sectional views of alternative embodiments of a fiber preform 88 and 88' used for the manufacture of BOAS 77. Preforms 88 and 88' are intended to provide non-limiting examples of a geometry of BOAS 77. It will be understood by one of ordinary skill in the art that the geometry of BOAS 77, including the number and orientation of cooling channels can be varied as needed to meet thermal and mechanical stress requirements. Some of the possible alternative configurations are described herein although not illustrated. In some embodiments, a thermal barrier coating, environmental barrier coating, and/or abradable coating can be provided on a surface of BOAS 77. Thermal barrier coatings and environmental barrier coatings can protect the CMC component from degradation. Abradable coatings can be applied in a blade rub zone to maintain close clearances thereby improving turbine efficiency.

FIG. 3 illustrates fiber preform 88, which includes cooling channels 90a-90c fed by a source of cooling fluid through inlet apertures 92a-92c. As illustrated, cooling channels 90a-90c can extend in a circumferential direction relative to engine axis A. Preform 88 has three cooling channels 90a, 90b, 90c located adjacent one another and configured to cover an axial extent of BOAS 77, extending from a leading edge LE to a trailing edge TE. While positioning cooling channels along a full axial extend of BOAS 77 can provide cooling fully along a radially inner wall positioned in the gas path, alternative configurations, which do not provide cooling along the full axial extent of BOAS 77, are also contemplated.

As illustrated in FIG. 3, a cooling fluid flow $C_f$ can be fed to leading edge cooling channel 90a through a pair of apertures 92a. Cooling channel 90a can be substantially closed at an intersegment side 93 of BOAS 77 adjacent to apertures 92a to direct cooling fluid flow $C_f$ through cooling channel 90a as indicated by the $C_f$ arrow. In some embodiments, an adjacent BOAS 77 can be configured to allow flow exiting cooling channel 90a from an outlet at an opposite intersegment side 94 to enter a cooling fluid channel in the adjacent BOAS. In other embodiments, cooling channel 90a can be substantially closed at intersegment outlet 94 and cooling fluid flow $C_f$ can be forced to exit through a plurality of intersegment gas path-facing film cooling apertures (not shown) as known in the art. Cooling fluid $C_f$ can enter cooling channel 90b through a pair of apertures 92b. Cooling channel 92b can be substantially closed (not shown) at intersegment side 94 to direct cooling fluid flow $C_f$ in a circumferential direction as illustrated by the $C_f$ arrow. In some embodiments, cooling channel 90b can be fluidly connected to cooling channel 90c to allow cooling fluid flow $C_f$ exiting cooling channel 90b at intersegment side 93 to enter cooling channel 90b at intersegment side 93 and flow back toward intersegment side 94 as illustrated by the $C_f$ arrow. Cooling channels 90b and 90c can be substantially closed (not shown) at intersegment side 93 to limit cooling fluid flow $C_f$ exiting BOAS 77 at intersegment side 93, while allowing cooling fluid $C_f$ to pass from cooling channel 90b to cooling channel 90c. In alternative embodiments, cooling channel 90c can be fluidly separated from cooling fluid channel 90b and cooling fluid can be fed to cooling channel 90c through optional apertures 92c (shown in phantom). Intersegment side or wall members (not shown) used to close or restrict cooling channels 90a-90c can be formed separately and joined to preform 88 following densification of fiber preform 88 via brazing or other suitable methods known in the art. Cooling fluid $C_f$ can exit cooling fluid channels 90b and 90c through intersegment or gas path-facing film cooling apertures. In some embodiments, one or both cooling channels 90b, 90c can be open at intersegment sides 93 or 94 to allow cooling fluid $C_f$ to enter cooling channels of adjacent BOAS as described with respect to cooling channel 90a. The internal cooling channels can function to actively cool BOAS 77 during operation to reduce bulk temperature, or to passively cool BOAS 77 to reduce through wall thermal gradients. Internal cooling channels can enable intersegment cooling via cooling holes directed between adjacent BOAS segments, as well as film cooling along a radially inner face of BOAS 77 exposed to the hot gas path. Although FIG. 3 illustrates three cooling channels 90a-90c, it should be appreciated that the number of cooling channels and fluid interconnection of cooling channels can be varied based on cooling needs, and that any number of cooling channels can be contemplated. In the disclosed BOAS, cooling channels configured to extend circumferentially (as illustrated) can generally range in number from two to six. The number of cooling fluid feed apertures 92a-92c can vary accordingly. Additionally, the location and number of feed apertures for each cooling channel can be varied as needed to maintain pressure requirements.

In alternative embodiments, a single serpentine cooling channel may be used or walls of a braided sleeve may be compressed together to form multiple cooling channels. In some embodiments, a component can have spiral cooling channels originating at one or more center points and exiting at a rear of the component. As will be discussed further herein, braided fiber sleeves can have a constant or variable cross-sectional shape to form cooling channels that change in geometry along a flow path. Additionally, braided fiber sleeves can be formed with internal structure to improve heat transfer and/or fluid flow. By varying the cross-section of fiber bundles within the braid (or weave/knit), cooling channels can be created with internal roughness that enhances heat transfer. Additionally, fibers can be introduced in a braided sleeve in a single rotating direction to create swirling of air within the cooling passage during operation.

BOAS fiber preform 88 is formed from a plurality of braided fiber sleeves 96 (i.e., tubular braid with seamless fiber continuity from end to end), which are enclosed or wrapped in one or more layered woven or braided fiber plies 98. Suitable materials used to make braided fiber sleeves 96 and fiber plies 98 can include, but are not limited to carbon, silicon carbide (SiC), alloyed and/or zirconium carbide, hafnium carbide, aluminum silicate, alumina, and other materials known in the art for use in various environmental conditions, including varying operational temperatures. Fibers can be impregnated with a SiC matrix and various binders. Interface coatings, such as boron nitride, can be applied to the fibers before or after a layup process to protect fibers from oxidation during operation.

Cooling channels 90a-90c of fiber preform 88 are formed from braided fiber sleeves 96. Braided fiber sleeves offer multiple advantages over woven or unidirectional fiber plies. Braided fiber sleeves 96 have continuous fibers that are mechanically interlocked with one another providing for an efficient distribution of load and resistance to impact and crack propagation. Interlaminar shear properties are improved when braided fiber sleeves are nested together, which can further limit crack propagation. Braided fiber sleeves can expand to accommodate irregular cross-sections and can form irregular shapes. Because fibers are braided on the bias, there is a reduced tendency for fiber breakage when forced to accommodate a small radius. Braided fiber sleeves 96 can be formed from a biaxial braid or a triaxial braid, which provides reinforcement in the axial direction. The angles of the fibers of the braid can be tailored to balance the stresses better than is possible with a 0/90 woven fabric, which makes the braid structurally more efficient than a woven fabric for cooling channels that are required to hold cooling fluid at a higher pressure than the working fluid in the engine core gas path.

Each of cooling channels 90a-90c is defined by a braided fiber sleeve comprising nested fiber braids aligned concurrently to form inner wall 100 and outer wall 102. As illustrated in FIG. 3, braided fiber sleeves 96 can be consolidated to form an oblong shape with radiused ends 104 separated by elongated sides 105. A length of elongated sides 105 can vary depending on the number cooling channels present. In the embodiment disclosed in FIG. 3, a cross-section of cooling channels 90a-90c has an aspect ratio of approximately 8:1. In alternative embodiments, cooling channels 90a-90c can be substantially cylindrical, having a circular cross-section. Bending constraints of braided fiber sleeves 96 generally limit radiused ends to a minimum radius around 0.25 millimeters, providing a cooling channel height h of 0.5 millimeters. In the embodiment disclosed in FIG. 3, cooling channels 90a-90c can have a channel height ranging from 0.5 to 2 millimeters, and radii of radiused ends 104 ranging from 0.25 to 1 millimeters.

Fiber plies 98 can encase cooling channels 90a-90c thereby forming inner radial wall 106 facing the engine gas path and outer radial wall 108. Plies can generally have a thickness ranging from 0.005 inches to 0.015 inches (0.13 millimeters to 0.38 millimeters). It should be appreciated that the number of plies or layers forming each of walls 106 and 108 can vary depending on ply thickness and structural requirements. Fiber plies 98 can be formed from separate fiber sheets, which can be a woven or braided fabric. Fiber plies 98 can be wrapped to extend from attachment mechanisms 110 and 112 underneath cooling channels 90a-90c to provide additional support. It should be appreciated that alternative fiber ply layup configurations are contemplated and that the design can be modified accordingly to accommodate varying structural requirements. Gaps between plies or locations where plies are absent can be filled with small braids or chopped fibers.

FIG. 4 is a schematicized sectional view of an alternative fiber preform 88' for the manufacture of BOAS 77. Preform 88' is similar to preform 88 but includes a braided fiber overwrap 114. Braided fiber overwrap 114 can replace a portion or all of fiber plies 98 and can be formed from one or more braided fibers sleeves. Braided fiber overwrap 114 can fully wrap around braided fiber sleeves 96 to form BOAS walls 106 and 108. Braided fiber overwrap 114 can be shaped to provide attachment mechanisms 110' and 112'.

The use of braided fiber overwrap 114 provides a seamless fiber preform structure, providing added strength and resistance to crack formation.

FIG. 5 is a schematicized sectional view of cooling channel 90a at different stages in the manufacturing process. Cooling channel 90a (as well as all other cooling channels disclosed) can be formed by braiding fiber sleeve 96 on a mandrel to produce a cylindrical tube as illustrated by step 1 in the process. In step 2, braided fiber sleeve 96 can be consolidated to a desired aspect ratio or to provide a desired cooling channel height. In alternative embodiments, cooling channel 90a can be formed by braided fiber sleeve 96 on a mandrel more closely matched to the desired shape of cooling channel 90a, such that limited or no compression of braided sleeve 96 is necessary. This can limit an amount of buckling of inner wall 100 that can occur during shaping.

Plies 98 or braided sleeves 114 can be laid up around multiple consolidated braided fiber sleeves 96 to form preform 88 or 88' with cooling channels 90a-90c. In some embodiments, braided fiber sleeves 96 can be placed on mandrels capable of maintaining cooling channels 90a-90c during CVI or other densification process and capable of being extracted in post processing. In alternative embodiments, braided fiber sleeves 96 can be separately densified—partially or fully—before layup with fiber plies 98 or braided fiber sleeves 114. As such, use of additional tooling to maintain cooling channels 90a-90c can be avoided during densification of fiber preform 88 or 88'. This may allow for the addition of intersegment walls or other structures that could have limited extraction of tooling post densification. Hoop oriented fibers (low braid angle or woven 0/90 tubes) can also provide reasonable resistance to compression and, therefore, support for subsequent processing without internal tooling. This results in significant additional design space for optimization of cooling channels without the constraint of mandrel removal. Although FIG. 5 illustrates consolidation to form an oblong passage, other shapes are contemplated including shapes that are asymmetrical in cross-section or along an axial length of the sleeve. In some embodiments, inner walls 100 can be pinched or pressed together along a full or partial length of the braided fiber sleeve to divide the channel 90a into multiple channels. Inner walls can be held together with a polymer or other binder material, stitching, needling, use of a press or mold positioned on outer wall 102 during a densification process, or other methods known in the art.

The use of braided fiber sleeves provide additional advantages over other CMC cooling channel manufacturing methods. For example, integral internal surface features, which can improve heat transfer, can be formed in the braided fiber sleeve in the braiding process. The cross-section of fiber bundles within the braid (or weave/knit) can be varied to create cooling channels with internal roughness and increased surface area, which can enhance heat transfer. Additionally, fibers can be introduced in a braided sleeve in a single rotating direction to create swirling of air within the cooling passage during operation. FIG. 6 provides a schematicized sectional view of one example of a braided fiber sleeve with integral internal surface features, illustrated at different stages of the manufacturing process. FIG. 6 illustrates braided fiber sleeve 116 with inner wall 118, outer wall 120, and fill material 122; mandrel 124; and temporary molding structures 126. Mandrel 124 can be cylindrical with a constant or varying circular or oblong cross-section or can be otherwise shaped to provide a desired braided sleeve geometry. Rings or helical structures 126 can be placed around a perimeter of mandrel 124 to provide a temporary mold to which inner wall 118 can generally conform to during the braiding process and which can provide braided fiber sleeve 116 with integral internal surface structures 128 when mandrel 124 and molding structures 126 are removed. Temporary molding structures 126 can be any type of material (e.g., polymer, carbon, metal) that can be removed from the braided fiber sleeve, for example, by melting, burning, etching, or other chemical process as known in the art. In an alternative embodiment, elastomeric o-rings can be used to form temporary molding structures 126. The o-rings can be seated onto the mandrel in sufficient tension to allow the o-rings to easily fall out or be physically removed from the cavity when the mandrel is removed. Internal surface structures 128 can increase convective heat transfer capability of fiber sleeve 116 by providing increased surface area and promoting optimal fluid flow. Spacing between rings or turns of the helical structure 126, outer geometry, thickness, and height (distance protruding from mandrel 124) can be varied to accommodate varying design requirements including heat transfer, fluid dynamics, and subsequent shaping or consolidation of braided fiber sleeve 116.

Inner wall 118 can be braided over mandrel 124 and molding structures 126. Fill material 122 can be provided on an outer surface of inner wall 118 to press inner wall 118 toward mandrel 124 between molding structures 126 thereby forming internal protrusions 128. Fill material can include fiber tows of the same material of inner wall 118 wrapped around inner wall 18. Outer wall 120 can be braided over inner wall 118 and fill material 122. Fill material 122 can be sized to allow outer wall 120 to be formed with a generally smooth outer surface.

Following the braiding process, mandrel 124 and molding structures 126 can be removed, providing braided fiber sleeve 116 with internal surface structures 128. Fiber sleeve 116 can be incorporated into a CMC component preform as described with respect to the manufacture of a BOAS in FIGS. 3-5. Fiber sleeve 116 can be further consolidated or shaped to a desired geometry. The addition of internal surface structures 128 can assist with bending of braided fiber sleeve 116 in a stable radius without buckling as illustrated in FIG. 6.

In an alternative embodiments, mandrel 124 can have a cylindrical shape with removable elongated segments that run along a length of mandrel 124. Inner wall 118 can be braided over the cylindrical mandrel 124, segments can be removed from mandrel 124 from an end of mandrel 124, and fill material 122 can be used to press inner wall 118 into channels formed in mandrel 124 by the removal of the segments. Outer wall can then be braided over inner wall 118 and fill material 122 to maintain internal protrusions formed by inner wall 118 and fill material 122 when mandrel 124 is removed. In another embodiment, mandrel 124 can be shaped with elongated channels that run along a length of mandrel 124. Inner wall 118 can be formed over the shaped mandrel 124. Fill material 122 can be used to press inner wall 118 into the channels to form internal protrusions, and outer wall can be braided over inner wall 118 and fill material 122 to maintain the internal protrusions when mandrel 124 is removed.

Figure 7C:
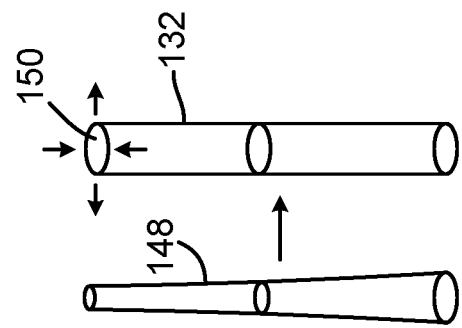
FIGS. 7B and 7C are schematicized views of cooling channels of FIG. 7A in different stages of a manufacturing process.
Figure 7B:
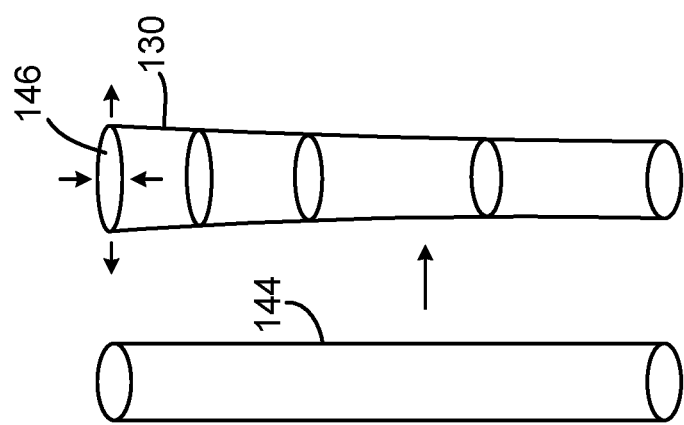
Figure 7A:
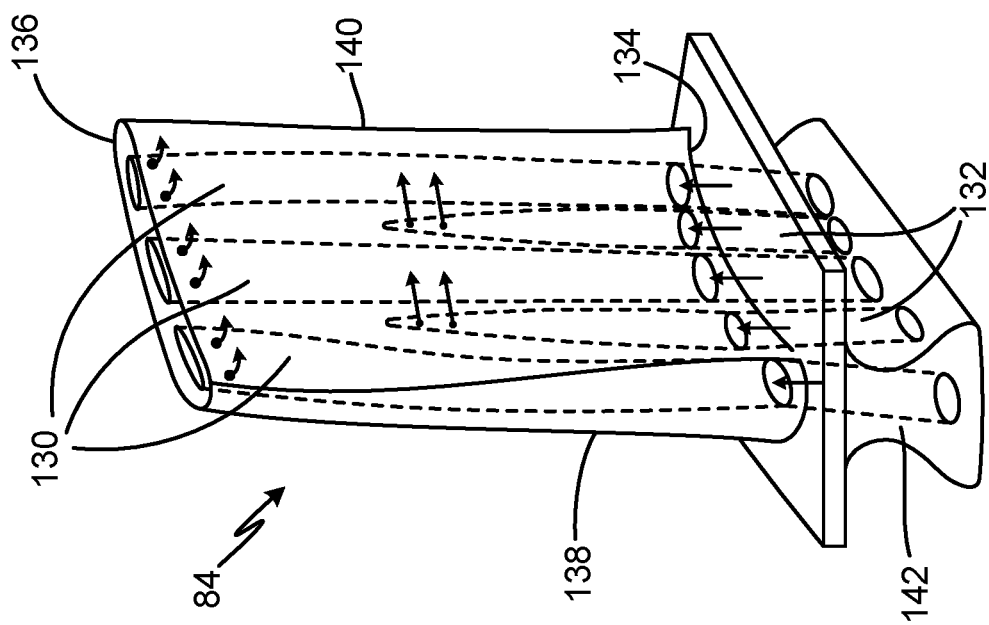
FIG. 7A is a schematicized perspective view of the blade of FIG. 2 with cooling channels.

Braided fiber sleeves can be used to provide cooling channels that change in cross-sectional shape and/or cross-sectional area over an axial length of the channel, which can be advantageous for the manufacture of CMC components having complex shapes. FIG. 7A provides a schematicized perspective view of airfoil 84 of FIG. 2 with internal cooling channels 130 and 132. FIGS. 7B and 7C provide schematicized views of cooling channels 130 and 132, respectively, at different steps in a manufacturing process. Airfoils of blades and vanes can have dramatic changes in cross section, which can require cooling channels that likewise vary in cross-sectional shape and/or area over a span and chord of the airfoil. As illustrated in FIG. 7A, airfoil 84 reduces in thickness from base 134 to tip 136 and from leading edge 138 to trailing edge 140. Cooling channels 130 and 132 can have generally large and round inlets and passages through root portion 142 and into portions of base 134 that have a thickened region to accommodate channels having larger cross-sectional areas. Cooling channels 130 flatten toward tip 136 as airfoil thickness decreases, providing an oval or oblong, racetrack-shaped, channel. Cooling channels 132 both flatten and taper inward toward the tip to fit within spaces provided between cooling channels 130. Arrows indicate the direction of airflow through cooling channels 130 and 132. Cooling channels 130 and 132 can be closed at an outer end. Outlet cooling holes can be machined into channels to provide for film cooling of outer airfoil surfaces or exhaust of cooling air from the airfoil.

FIG. 7B illustrates the manufacture cooling channel 130. Cooling channel 130 can be formed from braided fiber sleeve 144 having a constant cross-section along an axial length. As illustrated, braided fiber sleeve 144 has a round cross-sectional shape that does not change in size over the length of the sleeve. Cooling channel 130 can be formed by compressing a portion of braided fiber sleeve 144 to flatten braided fiber sleeve 144 along a portion of the length and produce oval-shaped channel 146, which can be disposed in the thinner tip portion of airfoil 84. The shape of cooling channel 130 can be maintained during densification of a preform in which cooling channel 130 is disposed in a manner consistent with that disclosed for manufacture of cooling channels 90a-90c as discussed with respect to FIG. 5.

FIG. 7C illustrates the manufacture of cooling channel 132. Cooling channel 132 can be formed from braided fiber sleeve 148, which tapers in cross-section along an axial length of braided fiber sleeve 148. Tapered fiber sleeve 148 has a round cross-sectional shape that reduces in size over the length of the sleeve. Tapered fiber sleeve 148 can be formed on a mandrel of the same shape. Cooling channel 132 can be formed by compressing a portion of braided fiber sleeve 148 to flatten braided fiber sleeve 148 along a portion of the length and produce oval-shaped channel 150, which can be disposed in the thinner portion of airfoil 84 between cooling channels 130. The shape of cooling channel 132 can be maintained during densification of a preform in which cooling channel 132 is disposed in a manner consistent with that disclosed for manufacture of cooling channels 90a-90c as discussed with respect to FIG. 5.

Cooling channels 130 and 132 are provided merely as examples of the types of cooling channel geometries that can be formed using braided fiber sleeves. Other configurations and arrangements within a CMC component, including but not limited to airfoils, are contemplated. For example, a braided fiber sleeve can be used to form serpentine and bifurcating or branching channels as known in the art. Channels can have multiple variations in cross-sectional shape and area along a length to accommodate changing component thicknesses. For example, a serpentine channel disposed in an airfoil can include multiple turns between a base and tip and multiple flattened and expanded sections corresponding to variations in the airfoil thickness. In some embodiments, inner walls of a braided fiber sleeve can be pinched or pressed together to split a channel into two or more channels over a portion of a length of the cooling channel.

Figure 8:
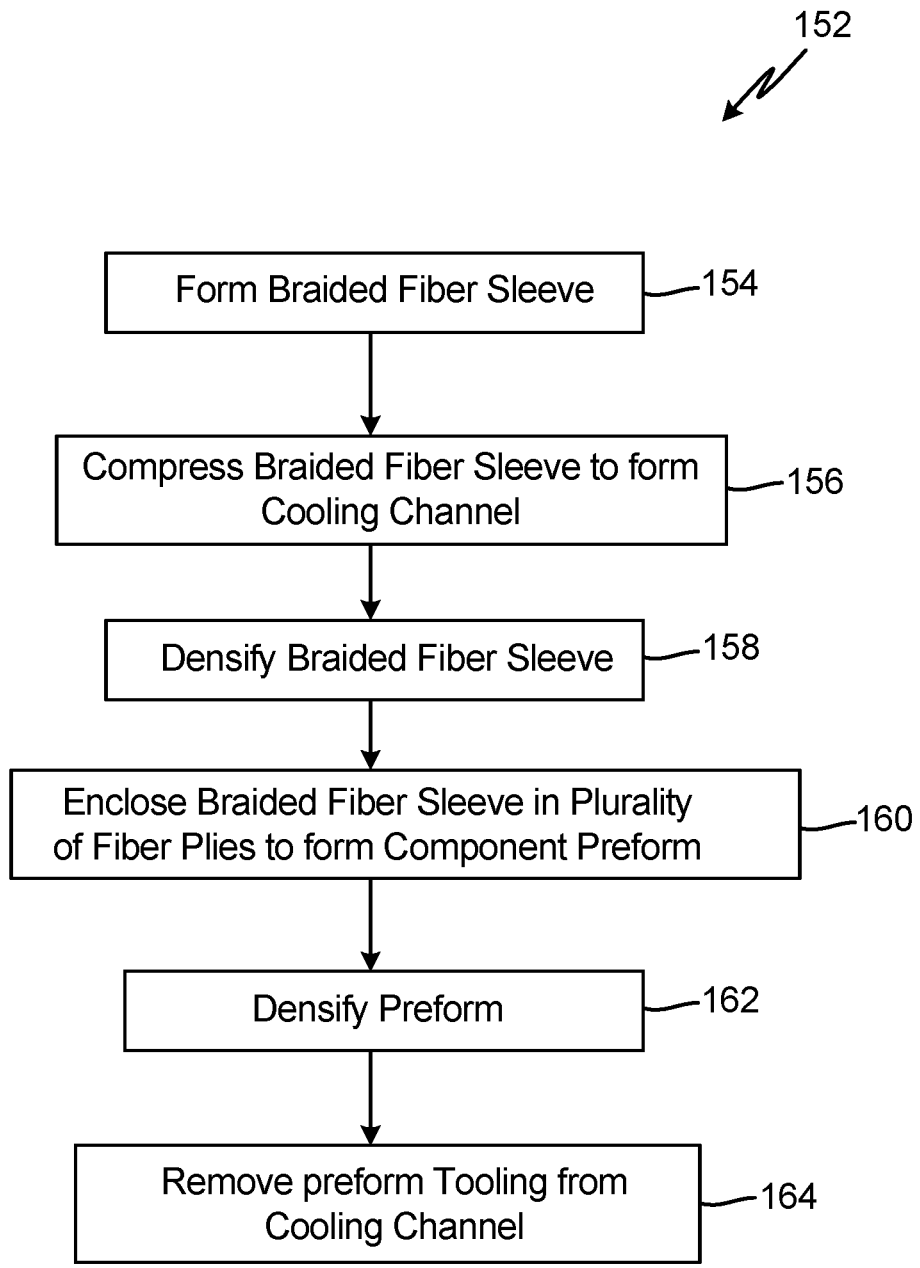
FIG. 8 is a flow chart of a method of manufacture of a CMC component.

FIG. 8 is a flow chart of method 152 of manufacture of a CMC component. One or more braided fiber sleeves can be formed on a graphite mandrel or other removable tooling (e.g., dissolvable or removed via vaporization/sublimation) in step 154. In some embodiments, the mandrel can be slightly tapered from one end to another to allow for mechanical extraction of a graphite mandrel following densification. The mandrel can be shaped to provide a desired cooling channel geometry. Alternatively, the braided fiber sleeve can be consolidated or shaped in step 156 to provide the desired cooling channel dimensions. In some embodiments, braided fiber sleeve can be partially or fully densified via CVI or other process in step 158 to produce rigid structures that can be maintained during densification of a preform in which the sleeve is disposed without the need for a temporary mandrel. In other embodiments, hoop oriented fibers (low braid angle or woven 0/90 tubes) can also provide reasonable resistance to compression of the fiber sleeve, such that a channel opening can be retained without pre-rigidizing or mandrel support during preform densification. In step 160, the braided fiber sleeve can be enclosed in a plurality of fiber plies or braided fiber sleeves to produce a preform of the component. The fiber preform can be densified with a ceramic matrix in step 162 using CVI, precursor infiltration and pyrolysis, slurry infiltration, melt infiltration, and combinations thereof as known in the art. Any tooling used to maintain cooling channels during densification can be removed in step 164. Additional processing or finishing procedures as known in the art can be performed, including deposition of a thermal barrier or environmental barrier coating. Apertures can be ultrasonically machined through walls of the CMC component to provide a conduit for cooling fluid into or out of the cooling channels.

Cooling channels constructed of CMC braided sleeves enable large film cooling access across the gas path face of a CMC component and reduce through-wall thermal gradients along a component inner wall. The use of CMC braided sleeves provides for seamless channel construction and can increase the specific stiffness of the CMC component, provide an efficient distribution of load, and provide resistance to crack propagation. Additionally, braided fiber sleeves can be used to form cooling channels having a variety of geometries, including geometries that change along a cooling flow path or branch into multiple channels. Internal structures can be formed in the braiding process to increase surface area and optimize fluid flow.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A fiber-reinforced component for use in a gas turbine engine includes a fiber sleeve forming a cooling channel and a plurality of fiber plies enclosing the fiber sleeve, with the plurality of fiber plies forming first and second walls separated by the fiber sleeve. The fiber-reinforced component further includes a matrix material between fibers of the fiber sleeve and the plurality of fiber plies.

The fiber-reinforced component of the preceding paragraph can optionally include, additionally and/or alternatively, any one or more of the following features, configurations and/or additional components:

The fiber-reinforced component of any of the preceding paragraphs, wherein the fiber sleeve can change in cross-sectional shape along an axial length of the fiber sleeve.

The fiber-reinforced component of any of the preceding paragraphs, wherein the fiber sleeve can change in cross-sectional area along an axial length of the fiber sleeve.

The fiber-reinforced component of any of the preceding paragraphs, wherein an inner wall of the fiber sleeve can be pressed together along at least a first portion of an axial length of the fiber sleeve to divide the fiber sleeve into a plurality of cooling channels along the first portion of axial length.

The fiber-reinforced component of any of the preceding paragraphs, wherein a second portion of the axial length of the fiber sleeve can have a single cooling channel.

The fiber-reinforced component of any of the preceding paragraphs, wherein the fiber sleeve can further include integral internal structures that protrude from an inner wall of the fiber sleeve.

The fiber-reinforced component of any of the preceding paragraphs, wherein the integral internal structures can comprise a plurality of rings spaced along an axial length of the fiber sleeve.

The fiber-reinforced component of any of the preceding paragraphs, wherein the integral internal structures can comprise a plurality of turns forming a helix along an axial length of the fiber sleeve.

The fiber-reinforced component of any of the preceding paragraphs, wherein the sleeve can include an inner wall formed by a first fiber sleeve, a fiber fill material disposed on an outer surface of the inner wall in locations of the integral internal structures, and an outer wall formed by a second fiber sleeve, with the outer wall disposed around the fiber fill material and inner wall.

The fiber-reinforced component of any of the preceding paragraphs, wherein the fiber fill material can comprise a structure selected from the group consisting of a plurality of fiber rings and a fiber tow wrapped around the inner wall.

The fiber-reinforced component of any of the preceding paragraphs, wherein the fiber sleeve and the plurality of fiber plies can comprise materials selected from the group consisting of: carbon fibers and ceramic fibers.

The fiber-reinforced component of any of the preceding paragraphs, wherein the braided fiber sleeve can comprise a triaxial braid.

The fiber-reinforced component of any of the preceding paragraphs, wherein the matrix material can comprise a ceramic.

A method for manufacturing a fiber-reinforced component with integral fiber-formed cooling channels for use in a gas turbine engine includes forming a fiber sleeve, enclosing the fiber sleeve with a plurality of fiber plies to form a fiber preform of a component with internal cooling provided by the cooling channel, and densifying the fiber preform.

The method of the preceding paragraph can optionally include, additionally and/or alternatively, any one or more of the following features, configurations, additional components, and/or steps:

The method of any of the preceding paragraphs can further include densifying the first fiber sleeve prior to enclosing the first fiber sleeve with a plurality of fiber plies.

The method of any of the preceding paragraphs, wherein the fiber sleeve can be formed with a reduced cross-sectional area along an axial length of the fiber sleeve.

The method of any of the preceding paragraphs, wherein consolidating the fiber sleeve can comprise flattening the fiber along at least a portion of an axial length of the fiber sleeve to change a cross-sectional shape of the cooling channel.

The method of any of the preceding paragraphs, wherein consolidating the fiber sleeve can comprise pressing an inner wall of the braided fiber sleeve together along at least a portion of an axial length of the fiber sleeve to divide the fiber sleeve into a plurality of cooling channels along the portion of axial length.

The method of any of the preceding paragraphs, wherein forming the fiber sleeve can include applying molding structures to a mandrel, forming a first fiber sleeve over the mandrel and molding structures to form an inner wall, applying fiber fill material to an outer surface of the first fiber sleeve in locations between molding structures to conform the inner wall to the molding structures, forming a second fiber sleeve over the fiber fill material and first fiber sleeve to form an outer wall, and removing the mandrel and molding structures from the fiber sleeve.

The method of any of the preceding paragraphs, wherein the fiber fill material can comprise a structure selected from the group consisting of a plurality of fiber rings and a fiber tow wrapped around the outer surface of the first fiber sleeve.

The method of any of the preceding paragraphs, wherein the molding structures can comprise a plurality of fiber rings or a fiber tow wrapped around the outer surface of the mandrel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A fiber-reinforced component for use in a gas turbine engine, the fiber-reinforced component comprising:
   a fiber sleeve forming a cooling channel, wherein the fiber sleeve comprises:
      a first fiber sleeve layer forming an inner wall of the fiber sleeve and molded to form protrusions that extend into the cooling channel; and
      a fiber fill material disposed on an outer surface of the first fiber sleeve layer in locations of the protrusions to fill regions defined by the protrusions;
   a plurality of fiber plies enclosing the fiber sleeve, the plurality of fiber plies forming first and second walls separated by the fiber sleeve; and
   a matrix material between fibers of the fiber sleeve and the plurality of fiber plies.

2. The fiber-reinforced component of claim 1, wherein the fiber sleeve changes in cross-sectional shape along an axial length of the fiber sleeve.

3. The fiber-reinforced component of claim 1, wherein the fiber sleeve changes in cross-sectional area along an axial length of the fiber sleeve.

4. The fiber-reinforced component of claim 1, wherein the inner wall of the fiber sleeve is pressed together along at least a first portion of an axial length of the fiber sleeve to divide the fiber sleeve into a plurality of cooling channels along the first portion of axial length.

5. The fiber-reinforced component of claim 4, wherein a second portion of the axial length of the fiber sleeve has a single cooling channel.

6. The fiber-reinforced component of claim 1, wherein the protrusions comprise a plurality of rings formed around the fiber sleeve and spaced along an axial length of the fiber sleeve.

7. The fiber-reinforced component of claim 1, wherein the protrusions form a helix around the fiber sleeve.

8. The fiber-reinforced component of claim 1, wherein the fiber sleeve further comprises:
   a second fiber sleeve layer forming an outer wall of the fiber sleeve, the outer wall disposed around the fiber fill material and first fiber sleeve layer.

9. The fiber-reinforced component of claim 1, wherein the fiber fill material comprises a structure selected from the group consisting of a plurality of fiber rings and a fiber tow wrapped around the first fiber sleeve layer.

10. The fiber-reinforced component of claim 1, wherein the fiber sleeve comprises a triaxial braid.

11. The fiber-reinforced component of claim 1, wherein the matrix material comprises a ceramic.

12. A method for manufacturing a fiber-reinforced component with integral fiber-formed cooling channels for use in a gas turbine engine, the method comprising:
   forming a fiber sleeve, wherein the fiber sleeve forms a cooling channel; wherein forming the fiber sleeve comprises:
      molding a first fiber sleeve layer to form protrusions that extend into the cooling channel; and
      disposing a fiber fill material on an outer surface of the first fiber sleeve layer in locations of the protrusions to fill regions defined by the protrusions;
   enclosing the fiber sleeve and the fiber fill material with a plurality of fiber plies to form a fiber preform of a component with internal cooling provided by the cooling channel; and
   densifying the fiber preform with a matrix material disposed between fibers of the fiber sleeve and the plurality of fiber plies.

13. The method of claim 12, and further comprising densifying the fiber sleeve prior to enclosing the fiber sleeve with the plurality of fiber plies.

14. The method of claim 12, wherein the fiber sleeve is formed with a reduced cross-sectional area along an axial length of the fiber sleeve.

15. The method of claim 12, and further comprising consolidating the fiber sleeve by flattening the fiber along at least a portion of an axial length of the fiber sleeve to change a cross-sectional shape of the cooling channel.

16. The method of claim 12, and further comprising consolidating the fiber sleeve by pressing the first fiber sleeve layer together along at least a portion of an axial length of the fiber sleeve to divide the fiber sleeve into a plurality of cooling channels along the portion of axial length.

17. The method of claim 12, wherein forming the fiber sleeve comprises:
   applying molding structures to a mandrel;
   forming the first fiber sleeve layer over the mandrel and molding structures to form an inner wall;
   applying the fiber fill material to the outer surface of the first fiber sleeve layer in locations between molding structures to conform the inner wall to the molding structures;
   forming a second fiber sleeve layer over the fiber fill material and first fiber sleeve layer to form an outer wall; and
   removing the mandrel and molding structures from the fiber sleeve.

18. The method of claim 17, wherein the fiber fill material comprises a structure selected from the group consisting of a plurality of fiber rings and a fiber tow wrapped around the outer surface of the first fiber sleeve.

19. The method of claim 18, wherein the molding structures comprise a plurality of fiber rings or a fiber tow wrapped around the outer surface of the mandrel.

* * * * *